Sept. 13, 1927.
C. C. TOMKINSON
PIPE HANGER
Filed Oct. 20, 1922
1,642,131
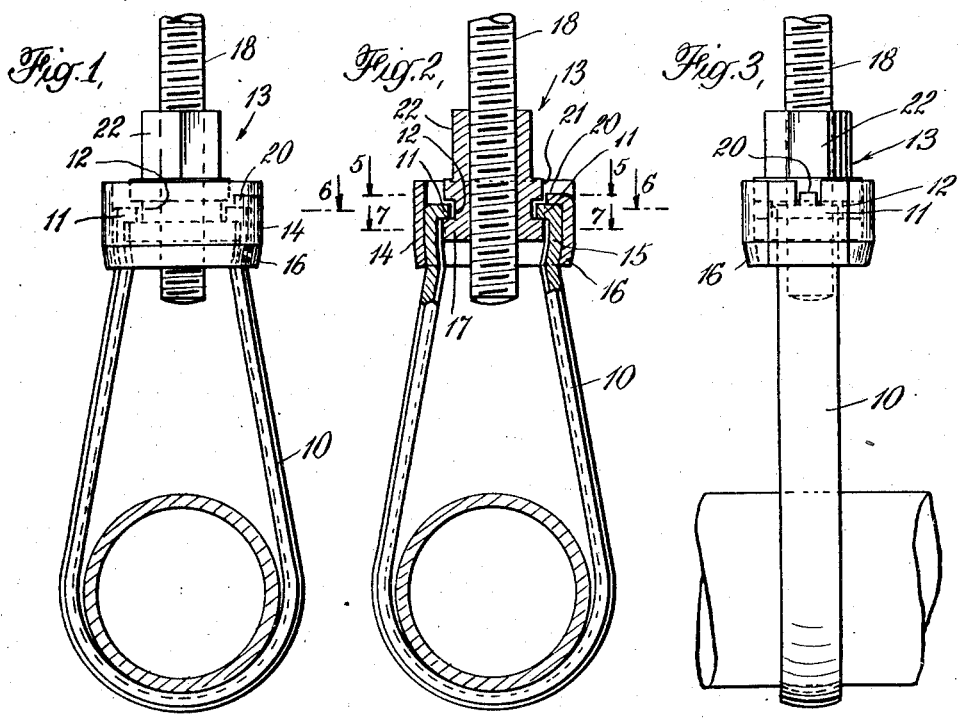
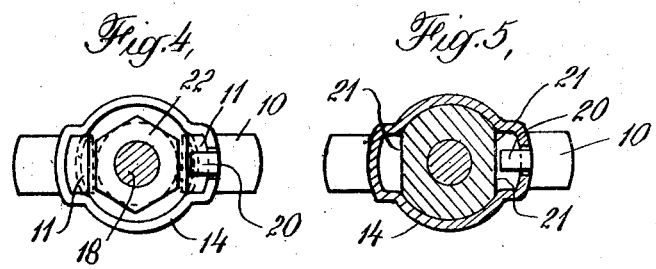
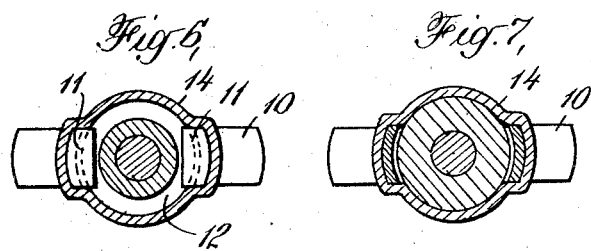
INVENTOR
Charles C. Tomkinson
BY
ATTORNEY Patented Sept. 13, 1927.

1,642,131

UNITED STATES PATENT OFFICE.

CHARLES C. TOMKINSON, OF PLAINFIELD, NEW JERSEY, ASSIGNOR TO J. EDWARD OGDEN, OF MOUNTAINVILLE, NEW YORK.

PIPE HANGER.

Application filed October 20, 1922. Serial No. 595,731.

This invention relates to supports and particularly to supports of the type known as pipe hangers used for suspending over-head pipe lines.

One of the objects of the invention is to provide a pipe hanger so constructed and arranged as to be adjustable toward or from the ceiling, wall or other fixed support to which it is attached after the hanger has been assembled and mounted in position.

Another object of the invention is to provide a hanger so constructed that the parts will be securely held in position after they have been adjusted.

Another object of the invention is to provide a pipe hanger so constructed and arranged that most of the parts thereof can be formed from sheet metal stampings thereby providing an inexpensive construction.

Another object of the invention is to provide a pipe hanger having the carrier for the pipe swiveled to the member on which the carrier is supported.

Another object of the invention is to provide a hanger that can be economically manufactured and easily installed.

Further objects of the invention will appear from the following description taken in connection with the drawings which form a part of this application and in which, Fig. 1 is an elevational view showing a pipe hanger constructed in accordance with the invention.

Fig. 2 is a view similar to Fig. 1 but showing the upper ends of the carrier, the sleeve or supporting member and the housing or retaining member for securing the carrier to the supporting member in section.

Fig. 3 is a side elevation of the construction shown in Fig. 1.

Fig. 4 is a top plan view of the structure shown in Fig. 1.

Fig. 5 is a transverse sectional elevation taken substantially on line 5—5 of Fig. 2.

Fig. 6 is a sectional elevation taken substantially on line 6—6 of Fig. 2, and

Fig. 7 is a sectional elevation taken substantially on line 7—7 of Fig. 2.

The invention briefly described consists of a hanger comprising a carrier having inwardly extending portions received in depressions or an annular groove in a supporting member such as a threaded sleeve and means for retaining these parts against separation. This retaining means as shown in the drawing consists of a ring or housing fitting over the ends of the carrier strap and retaining them in the groove or depressions formed in the threaded sleeve. Further details of the invention will appear from the following description.

As particularly shown in the drawings, the carrier consists of a single strap 10 preferably curved in section as shown in Fig. 7 and formed of resilient material. The ends of the strap 10 are bent inwardly as shown at 11 and these inwardly bent ends are positioned in an annular groove 12 formed in a sleeve of supporting member 13.

The ends of the carrier are retained in the groove 12 by means of a ring or housing 14 which surrounds the sleeve and carrier ends and engages the carrier ends preventing their escape from the groove 12. As clearly shown in Fig. 2 the upper ends of the carrier strap 10 are curved outwardly to a slight extent at 15 and the lower portion of the ring 14 is correspondingly curved inwardly as shown at 16. Because of the inturned lower edge 16 of the ring 14 provision is made for permitting the ends of the strap 10 to spring inwardly as the ring is placed thereover. This is accomplished by providing clearance between the inner wall of the groove 12 and the inner edges of the strap ends 11 and between the outer periphery of the head 17 on the sleeve and the inner surfaces of the end portions of the strap 10 when the parts are assembled as shown in Fig. 2.

When the ring 14 has been placed around the strap ends 10 these ends will be effectively retained in engagement with the groove in the sleeve 13.

From the foregoing description it will be seen that the sleeve or supporting member 13 is swiveled with reference to the hanger carrier, thereby providing for adjustment of the hanger on the threaded end portion 18 of the rod or bolt on which the hanger is suspended. In order, however, to retain the sleeve against rotation after the hanger has been properly adjusted, the ring or housing 14 has formed thereon a lug 20 adapetd to be bent inwardly as shown in Figs. 2, 3 and 5 into a position adjacent one or the other of the flat surfaces 21 formed on the sleeve 13. The upper end portion of the sleeve is hexagonal as shown at 22 to facilitate turning the sleeve by a wrench or other tool.

The hanger parts are assembled in the following manner. The strap 10 is first placed around the pipe or other object to be supported and the ends 11 of the strap are positioned in the groove 12 of the supporting member or sleeve 13. The ring or housing 14 is then snapped over the upper ends of the straps and these ends due to their resiliency are pressed inwardly to permit the inwardly curved lower portion 16 of the ring to pass into engagement with the curved portion 15 of the strap ends. The strap ends then spring outwardly to a slight extent but not to a sufficient extent to release them from the groove 12. The sleeve 13 may then be rotated on the threaded rod 18 to properly adjust the hanger and thereafter the lug 20 is bent inwardly to lock the sleeve against further rotation.

Although one specific embodiment of the invention has been particularly shown and described, it will be understood that the invention is capable of modification and that changes in the construction and in the arrangement of the various cooperating parts may be made without departing from the spirit or scope of the invention as expressed in the following claims.

What I claim is:—

1. A pipe hanger comprising a carrier having oppositely disposed inwardly extending portions, a supporting member having rigid flanges forming an annular groove receiving said portions, means for retaining said carrier portions in said groove, the inwardly extending portions of said carrier being swiveled in the supporting member, said retaining means having means for holding the supporting member against rotation with reference to the carrier.

2. A pipe hanger comprising a carrier strap of resilient material having outwardly curved end portions and inturned ends, a supporting member having a circumferential groove receiving said inturned ends and a ring surrounding the strap end portions and having an inturned portion engageable with the outwardly curved strap portions.

3. A pipe hanger comprising a carrier strap of resilient material having inturned ends, a threaded sleeve having an annular groove receiving said strap ends and a ring snapped over and engaging and retaining the strap ends in the sleeve groove.

4. A pipe hanger comprising a carrier strap of resilient material having outwardly curved end portions and inturned ends, a supporting member having a groove receiving said inturned ends and a ring surrounding the strap end portions and having an inturned portion engageable with the outwardly curved strap portions, the internal diameter of said ring being slightly greater than the external diameter of the supporting member plus the thickness of the end portions of the strap.

In witness whereof, I have hereunto set my hand this 19th day of October, 1922.

CHARLES C. TOMKINSON.